United States Patent [19]

Bowers

[11] Patent Number: 4,992,249
[45] Date of Patent: Feb. 12, 1991

[54] REDUCTION OF NITROGEN- AND CARBON-BASED POLLUTANTS THROUGH THE USE OF UREA SOLUTIONS

[75] Inventor: Wayne E. Bowers, N. Vassalboro, Me.

[73] Assignee: Fuel Tech, Inc., Stamford, Conn.

[21] Appl. No.: 90,417

[22] Filed: Aug. 27, 1987

Related U.S. Application Data

[63] Continuation of Ser. No. 784,826, Oct. 4, 1985, abandoned.

[51] Int. Cl.$^5$ ............................................. C01B 21/00
[52] U.S. Cl. .................................................. 423/235
[58] Field of Search ............................ 423/235, 235 D

[56]     References Cited
         U.S. PATENT DOCUMENTS

| 4,208,386 | 6/1980 | Arand et al. | 423/235 D |
| 4,325,924 | 4/1982 | Arand et al. | 423/235 |
| 4,507,269 | 3/1985 | Dean et al. | 423/235 |
| 4,624,840 | 11/1986 | Dean et al. | 423/235 |
| 4,627,965 | 12/1986 | Hegemann et al. | 423/242 |

FOREIGN PATENT DOCUMENTS 0112273  9/1978  Japan .................................. 423/235

OTHER PUBLICATIONS

Chemical Engineers Handbook, 4th edition, Perry pp. 18-68.

Primary Examiner—John Doll
Assistant Examiner—Lori F. Cuomo
Attorney, Agent, or Firm—St. Onge Steward Johnston & Reens

[57]  ABSTRACT

Disclosed is a process for reducing nitrogen oxides in an effluent from the combustion of a carbonaceous fuel under oxygen-rich conditions which minimize the production of carbon-based pollutants. A dispersion of a dilute aqueous urea solution is injected into an effluent at a temperature above 2000° F., and preferably above 2100° F. The concentration of the urea in solution and the size of the droplets in the dispersion are selected to provide the reduction in nitrogen oxides. The solution will preferably contain at least 80% by weight solvent and contain droplets sized within the range of from 150 to 10,000 microns.

16 Claims, No Drawings

REDUCTION OF NITROGEN- AND CARBON-BASED POLLUTANTS THROUGH THE USE OF UREA SOLUTIONS

This is a continuation of co-pending application Ser. No. 784,826, filed on Oct. 4, 1985, now abandoned.

TECHNICAL FIELD

The present invention relates to improvements in the combustion of carbonaceous fuels, and more particularly to improvements in firing large boilers with reduced emissions of carbon- and nitrogen-based pollutants.

Carbonaceous fuels burn more completely, with reduced emissions of carbon monoxide and unburned hydrocarbons, at oxygen concentrations and combustion air/fuel ratios which permit optimized high flame temperatures. When fossil fuels are used to fire large utility boilers, these temperatures are above 2000° F. and typically from about 2200° F. to 3000° F. Unfortunately, these high temperatures and hot spots of higher temperature tend to result in the production of thermal $NO_x$—the temperatures being so high that free radicals of nitrogen and oxygen are formed and chemically combine as nitrogen oxides ($NO_x$).

The flame temperature can be lowered to reduce $NO_x$ formation by the use of large excesses of air or fuel, or a hybrid of both processes known as staged combustion. However, these approaches create excessive carbon-based pollutants. There is no known set of conditions which can simultaneously reduce nitrogen- and carbon-based pollutants to acceptable levels without incurring severe economic penalties.

BACKGROUND ART

The need to reduce nitrogen- and carbon-based emissions while maintaining economic operation is a concern wherever carbonaceous fuels are burned. The requirements of each system for efficiency of fuel consumption must, of course, be considered in order to have a practical system.

In U.S. Pat. No. 3,599,427 to Jones et al, there is described a two stage catalytic system for treating the exhaust gases of mobile internal combustion engines. In the first catalytic stage, hot exhaust gases directly from an engine are treated at a high temperature to oxidize carbon monoxide and unburned hydrocarbons. The resulting exhaust gases are then cooled and passed through a separate, second catalytic stage to reduce levels of nitrogen monoxide. Prior to contact with the second stage catalyst, ammonia gas and other compounds such as urea, ammonium hydroxide, ammonium carbonate, and hexamethylenetetramine, are mixed with the exhaust gases. Upon contact with the second stage catalyst, nitrogen oxides are reduced to produce nitrogen and water.

In U.S. Pat. No. 3,846,981, Pacztowski discloses a more detailed, controlled two-stage catalytic system. The operating temperatures for the second catalytic stage where ammonia is utilized, are preferably within the range of from 275° F. to 900° F. This process and that of Jones et al unfortunately depend on the use of catalysts which create additional costs in terms of initial investment and servicing requirements.

In U.S. Pat. No. 3,900,554, Lyon discloses a non-catalytic system for educing nitrogen monoxide (NO) in a combustion effluent. Lyon discloses that ammonia and specified ammonia precursors, including ammonium carbonate also disclosed by Jones, et al, or their aqueous solutions, can be injected into the effluent for mixing with the nitrogen monoxide at a temperature within the range of 1600° F. to 2000° F. In one embodiment of the disclosed process, a reducing agent, such as hydrogen gas or various hydrocarbons, can be mixed with the effluent to permit the reduction reaction to occur at temperatures as low as 1300° F., thereby assuring avoidance of high temperature oxidation of ammonia to nitrogen monoxide. Lyon points out that at temperatures above 2000° F., the use of ammonia was counterproductive—increasing NO rather than decreasing it.

Unfortunately, large industrial boilers operate at temperatures significantly above 2000° F., and access to the interior of the heat exchangers where the 1600° F. to 2000° F. temperature exists following the flame zone of the boilers is not practical without major redesign due to exterior water jacketing and interior water tubes. At the exhaust end of the boilers, the temperature is reduced far below the minimum temperature of 1300° F. which can be used when a reducing agent is employed. Thus, the effective temperature range cannot readily be accessed for non-catalytic operability of Lyon's teaching in many large industrial boilers and certain other $NO_x$-producing combustion equipment.

In U.S. Pat. No. 3,961,018, Williamson discloses the purification of acid gas-containing streams at low temperatures approaching ambient. Williamson discloses contacting the gas stream with an amine vapor in sufficient concentration such that its partial pressure is at least 5% of the total pressure of the gas stream. This system thus requires large amounts of the treating gas and requires equipment for separating that gas from the effluent upon completing the treatment.

In a somewhat different environment, Goldstein et al, in U.S. Pat. No. 4,061,597 indicate that temperatures within the range of 1000° F. to 1300° F. are effective when using urea for reducing brown fumes caused by nitrogen dioxide ($NO_2$) from catalyst treatment effluents. One example in the patent employs a 30 weight percent aqueous solution of urea. Again, however, the temperature range of 1000° F. to 1300° F. is not practical for treatment of effluents from many types of combustion equipment.

In U.S. Pat. No. 4,325,924, Arand et al disclose the non-catalytic urea reduction of nitrogen oxides in fuel-rich combustion effluents. They indicate that under fuel-rich conditions, aqueous solutions of urea at concentrations of greater than 10%, and preferably greater than 20%, are effective nitrogen oxide reducers at temperatures in excess of 1900° F. Unfortunately, this effluent from staged combustion results in the production of high levels of carbonaceous pollutants.

In U.S. Pat. No. 4,208,386, on the other hand, Arand et al disclose that for oxygen-rich effluents, the temperature is in the range of from 1300° F. to 2000° F. for urea added dry or as a solution in water alone or with an alkanoic solvent. The use of the alkanoic solvent is said to enable reduction of the effective operating temperature to below 1600° F. No function, other than carrier for the urea, was disclosed for the water.

Operation under fuel-rich conditions has the disadvantages that combustion has been incomplete and carbon-based pollutants are excessive. Thus, despite the apparent ability of Arand et al to add the urea solution to fuel-rich effluents at temperatures above 1900° F. for reduction of nitrogen-based pollutants, this fuel-rich operation has economic and environmental penalties. And, operation under oxygen-rich conditions to achieve the desirable economies of fuel utilization and reduced carbon-based pollutants, causes practical difficulties in supplying the urea, ammonia or other useful material to a boiler under conditions where it will have its intended effect of reducing the levels of nitrogen oxide pollutants.

Accordingly, there is a present need for a process which enables the reduction of nitrogen and carbon-based pollutants by operating under efficient oxygen-rich conditions, but yet permits the treatment of the effluent at effective conditions with practical access to the interior of the boiler or other combustion effluent source.

DISCLOSURE OF INVENTION

The present invention provides a process for reducing the concentration of nitrogen oxides in an oxygen-rich effluent from the combustion of a carbonaceous fuel. The process comprises injecting a dispersion of an aqueous solution of urea or an equivalent into said effluent at an effluent temperature above 2000° F. The concentration of the urea in the solution and the size of the droplets in the dispersion, are selected to achieve reduction in nitrogen oxide levels in the effluent. A preferred embodiment of the invention provides for introducing a dilute aqueous solution of the urea at a plurality of injection points utilizing droplets having a Sauter mean diameter within the range of from about 150 to about 10,000 microns. Variations of particle sizes within this broad range have been found effective to achieve uniform mixing of the urea with the effluent gas. Preferably, the effluents will be at a temperature immediately following temperature.

For the purposes of this description, all temperatures herein are measured using an unshielded K-type thermocouple. Droplet sizes are determined with a Malvern 2200 instrument, utilizing a Franhofer diffraction, laser-based system. And, unless otherwise indicated, all parts and percentages are based on the weight of the composition at the particular point of reference.

The term urea as employed in this description includes the compound urea itself, as well as compounds equivalent in effect. Among the compounds are ammonium carbonate, ammonium formate, ammonium oxalate, ammonium hydroxide and various stable amines including hexamethylenetetramine, and mixtures thereof. Thus, unless otherwise specified, reference in this disclosure to urea should not be taken as limiting to urea itself but should extend to urea and all of its equivalents. It is pointed out that the term equivalent is not limited to exact equivalents, and various materials within the listing of equivalents will be optimally operable at some conditions which are different than those for others of the listed materials. Moreover, some of the materials may be more effective than others.

While not wishing to be bound by any particular theory, it is believed that the concentration of the water in the solution, the nature of the total solution in terms of its vaporization characteristics, the size of the droplets of the solution, and the uniformity of their distribution within the gas at the elevated temperatures employed according to the invention, are important to assure that the urea participates in $NO_x$ reduction and does not participate in the nitrogen oxide generation process or that the urea does not somehow otherwise become inactive without aiding in the reduction of nitrogen oxides.

Aqueous solutions are preferred according to the present invention due to their economy and can be employed with suitable effectiveness in most situations. The effective solutions will be dilute solutions of urea, typically containing at least 80% by weight water. More preferably, the solutions will contain greater than 90% water, to best enable uniform distribution of the urea within the effluent gas under conditions effective to reduce nitrogen oxide levels in the effluent. The solutions are preferably more dilute as the temperature is increased. It has been determined, however, that the surprising results achieved according to the invention are not due to simple cooling of the effluent gases by high concentration of water added. The effective levels of urea which can be employed in the treatment solutions, are preferably less than 20%, and more preferably within the range from about 0.5% to about 10% by weight of the solution. Levels of from about 0.5% to 7% are particularly preferred. There are instances where other solvents may be advantageous in combination with water.

The urea solution will be dispersed uniformly within the effluent gas stream at a point where the effluent is at a temperature above 2000° F. Large industrial boilers of the type employed for utility power plants and other large facilities, will typically be water jacketted and have access only at limited points. In the most typical situation, the boiler interior can be accessed only through burner access ports and at access ports above the flame where the temperatures at full load are typically within the range of from about 2050° F. to about 2600° F. For boilers operating efficiently with gas, the temperature at this point of access will typically fall within the range of from about 2100° to about 2600° F., and when fired with coal or oil, will typically fall within the range of about 2050° F. to 2400° F. These temperatures will not permit the effective introduction of solid urea or urea solutions as previously disclosed to the art.

The urea solutions according to the present invention are preferably injected at a number of spaced points where there is sufficient turbulence to distribute the droplets throughout the effluent. The solutions are injected from nozzles which are effective to uniformly form and disperse droplets of the solutions within the flowing effluent stream. The nozzles are located at a sufficient number of points to achieve uniform mixing. Preferably, the size of the droplets of solution will be within the range of from about 150 to about 10,000, and preferably greater than about 500, microns Sauter mean diameter. The droplet size is important to enable uniform mixing of the urea with the effluent and penetration of the urea sufficiently along the internal boiler path that it can achieve its intended function. The size of the droplets will preferably be increased with increasing temperature.

The concentration of the urea within the effluent gas should be sufficient to provide a reduction in nitrogen oxide levels. Typically, the urea will be employed at a molar ratio of urea to the baseline nitrogen oxide level of from about 1 to 4 to about 5 to 1, and will more preferably be within the range of from about 2 to 1 to about 1 to 2.

BEST MODE FOR CARRYING OUT THE INVENTION

The following Example describes the present invention and its utilization in a commercial utility boiler system.

EXAMPLE

A Babcock & Wilcox 110 megawatt utility boiler was fired with natural gas through seven of ten Peabody burners operated in a staged combustion format to maintain $NO_x$ levels within regulatory compliance at all times. Operation of all ten burners has not been possible without exceeding compliance maximums. At 7 locations, about 48 feet above the uppermost nozzles, a series of medium-to-course droplet forming atomizers was positioned to inject treatment solutions into the effluent which was at an average temperature above 2100° F. The following runs were made:

(1) a baseline run with no treatment solution;

(2) a 25 weight percent solution of urea in water supplied at a molar ratio of urea to $NO_x$ of 0.5 and injected at 20 psi to give droplets having Sauter mean diameter of from about 20 to 50 microns;

(3) a baseline as (1) but on the next successive day;

(4) the same conditions as (2), but injecting the solution at 5 psi, thereby increasing the size of the droplets to the range of 150 to 200 Sauter mean diameter;

(5) the same as (4), but employing a 5 weight percent solution of urea in water; and (6) the same as (4), but employing a 15 weight percent solution of urea in water.

Table 1 summarizes runs (1) through (5), and the results recorded.

TABLE 1

| Run | Droplet (micron) | Urea Conc. (Wt. %) | $NO_x$ (ppm)* | CO (ppm) | $NO_x$ Reduction (%) |
|---|---|---|---|---|---|
| (1) | NA | NA | 109.88 | 125 | NA |
| (2) | 25–50 | 25 | 102.76 | 106.63 | 6.48 |
| (3) | NA | NA | 115.88 | 106.85 | NA |
| (4) | 150–200 | 25 | 102.37 | 101.88 | 11.66 |
| (5) | 150–200 | 5 | 88.1 | 100.63 | 23.97 |
| (6) | 150–200 | 15 | 85.64 | 83.75 | 26.10 |

As a further test, all ten burners were fired to more closely approach stoichiometric fuel to oxygen ratios (as was indicated by an oxygen concentration of 2.4 measured in the effluent). For this test, the molar ratio of urea to $NO_x$ was set at unity. Table 2 shows that even under these more efficient combustion conditions as compared to runs (1) through (6) above, $NO_x$ levels were still maintained below 125 parts per million which is the current regulatory compliance limit, and the CO levels reduced significantly.

TABLE 2

| Run | Droplet (micron) | Urea Conc. (Wt. %) | $NO_x$ (ppm)* | CO (ppm) |
|---|---|---|---|---|
| (7) | 100–150 | 7 | 116.23 | 74.13 |

*Corrected to 3.0 oxygen excess in effluent.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention which is defined by the following claims.

I claim:

1. A process for reducing the concentration of nitrogen oxide in an oxygen-rich effluent from the combustion of a carbonaceous fuel, the process comprising:
   injecting a dispersion of droplets having a Sauter mean diameter of about 150 to about 10,000 microns of an aqueous solution containing urea into said effluent at an effluent temperature above 2050° F., the concentration of the urea in solution, less than 20 percent, and the size of the droplets in the dispersion being effective to achieve reduction of nitrogen oxide levels in the effluent.

2. A process according to claim 1 wherein the solution is injected into the effluent in amounts sufficient to provide a molar ratio of urea to nitrogen oxides of from 1:4 to 5:1.

3. A process according to claim 2 wherein the ratio of urea to nitrogen oxides is from 1:2 to 2:1.

4. A process according to claim 1 wherein the solution comprises at least 90% solvent, based on the weight of the solution.

5. A process according to claim 4 wherein the solution comprises from about 0.5% to about 10% urea based on the weight of the solution.

6. A process according to claim 5 wherein the solution comprises from about 0.5% to about 7% urea based on the weight of the solution.

7. A process according to claim 1 wherein the droplets are greater than about 500 microns.

8. A process according to claim 1 wherein the solution is injected into the effluent at a temperature of from 2050° F. to 2600° F.

9. A process for reducing the concentration of nitrogen oxides in an oxygen-rich effluent from the combustion of a carbonaceous fuel, the process comprising:
   injecting a dilute aqueous solution of urea into said effluent at an effluent temperature above 2050° F., at a concentration of the urea in solution of from 0.5% to 10%, the solution being dispersed within the effluent at a particle size of from about 150 to about 10,000 microns Sauter mean diameter, and the solution being injected into the effluent in amounts sufficient to provide a molar ratio of urea to nitrogen oxides of from 1:4 to 5:1.

10. A process for reducing the concentration of nitrogen oxides in an oxygen-rich effluent from the combustion of a carbonaceous fuel, the process comprising:
    injecting an aqueous solution of urea into said effluent at an effluent temperature above 2000° F., at a concentration of the urea in solution of from 0.5% to 10%, the solution being dispersed within the effluent at a particle size of from about 150 to about 10,000 microns Sauter mean diameter, and the solution being injected into the effluent in an amount effective to reduce the level of nitrogen oxides therein.

11. A process for reducing the concentration of nitrogen oxides in an oxygen-rich effluent from the combustion of a carbonaceous fuel, the process comprising:
    injecting a dispersion of a dilute aqueous solution of urea into said effluent at an effluent temperature above 2000° F., at a concentration of the urea in solution at a concentration of less than 10%, the particle size of droplets in the dispersion being greater than about 150 microns Sauter mean diameter, and the solution is injected into the effluent in an amount effective to reduce the level of nitrogen oxides therein.

12. A process according to claim 11 wherein the solution is injected into the effluent in amounts sufficient to provide a molar ratio of urea to nitrogen oxides of from 1:4 to 5:1.

13. A process according to claim 12 wherein the ratio of urea to nitrogen oxides is from 1:2 to 2:1.

14. A process according to claim 12 wherein the solution comprises from 0.5% to 10% urea based on the weight of the solution.

15. A process according to claim 14 wherein the droplets are greater than about 500 microns.

16. A process according to claim 12 wherein the solution is injected into the effluent at an effluent temperature of from 2050° F. to 2600° F.

* * * * *

UNITED STATES PATENT AND TRADEMARK OFFICE
CERTIFICATE OF CORRECTION

PATENT NO. : 4,992,249

DATED : February 12, 1991

INVENTOR(S) : Bowers

It is certified that error appears in the above-identified patent and that said Letters Patent is hereby corrected as shown below:

At Col. 1, line 67, "educing" should read --reducing--; and

At Col. 3, lines 34-35, "immediately following temperature" should be deleted and replaced with --in excess of 2050°F, most preferably in excess of 2100°F.--

Signed and Sealed this

Thirtieth Day of June, 1992

Attest:

DOUGLAS B. COMER

Attesting Officer

Acting Commissioner of Patents and Trademarks